(12) United States Patent
Giorgio et al.

(10) Patent No.: US 11,070,061 B2
(45) Date of Patent: Jul. 20, 2021

(54) VIRTUAL RESERVOIR STORING ENERGY FOR A HYDROELECTRIC POWER PLANT

(71) Applicant: AES Gener S.A., Santiago (CL)

(72) Inventors: Javier Giorgio, Santiago (CL); Joaquin Melendez, Santiago (CL)

(73) Assignee: AES Gener S.A., Santiago (CL)

( * ) Notice: Subject to any disclaimer, the term of this patent is extended or adjusted under 35 U.S.C. 154(b) by 0 days.

(21) Appl. No.: 16/593,380

(22) Filed: Oct. 4, 2019

(65) Prior Publication Data

US 2021/0104894 A1 Apr. 8, 2021

(51) Int. Cl.
*H02J 3/28* (2006.01)
*H02J 3/38* (2006.01)
*G05F 1/66* (2006.01)
*G05B 15/02* (2006.01)
*F03B 13/22* (2006.01)

(52) U.S. Cl.
CPC .............. *H02J 3/382* (2013.01); *G05B 15/02* (2013.01); *G05F 1/66* (2013.01); *F03B 13/22* (2013.01)

(58) Field of Classification Search
None
See application file for complete search history.

(56) References Cited

U.S. PATENT DOCUMENTS

| | | | |
|---|---|---|---|
| 6,512,966 B2 * | 1/2003 | Lof ......................... | H02J 3/008 700/291 |
| 9,556,853 B2 * | 1/2017 | Gupta .................... | H02H 3/006 |
| 9,817,423 B2 * | 11/2017 | King ......................... | H02J 7/34 |
| 10,389,126 B2 | 8/2019 | Kearns et al. | |
| 2012/0153722 A1 * | 6/2012 | Nazarian ................. | H02J 3/386 307/23 |
| 2012/0245744 A1 * | 9/2012 | Prosser .................... | H02J 3/46 700/286 |
| 2015/0369217 A1 * | 12/2015 | Gupta .................... | H02H 7/093 290/44 |
| 2017/0214245 A1 * | 7/2017 | Nazarian ................. | B60L 53/20 |
| 2017/0262037 A1 * | 9/2017 | Trifonov ............... | G06F 1/3209 |
| 2018/0076625 A1 * | 3/2018 | Gudgel .................... | H02J 1/001 |
| 2018/0076663 A1 * | 3/2018 | Gudgel .................... | H02J 3/386 |

(Continued)

FOREIGN PATENT DOCUMENTS

EP 3579369 A1 12/2019

OTHER PUBLICATIONS

International Search Report and Written Opinion dated Dec. 18, 2020 in PCT/CL2020/050113.

*Primary Examiner* — Tulsidas C Patel
*Assistant Examiner* — S. Mikailoff
(74) *Attorney, Agent, or Firm* — Morgan, Lewis & Bockius LLP

(57) ABSTRACT

A load management system for a hydroelectric power plant, includes a power generator configured to generate electrical energy from a flow of water for supplying a power grid, a virtual reservoir configured to store the generated electrical energy and dispatch the stored electrical energy to the power grid; a plurality of circuit breakers that connect an output of the power generator to the power grid and to the virtual reservoir; and a control unit configured to control operating states of the plurality of circuit breakers so that the generated electrical energy is stored at the virtual reservoir and at least one of the generated electrical energy or the stored electrical energy is provided to the power grid.

17 Claims, 4 Drawing Sheets

(56) References Cited

U.S. PATENT DOCUMENTS

2018/0096628 A1\* 4/2018 Fairchild .................. H02J 3/00
2019/0173283 A1\* 6/2019 Epel ......................... H02J 3/28
2019/0212713 A1\* 7/2019 Bennett ................ H02H 1/0092
2019/0237968 A1 8/2019 Higginson et al.

\* cited by examiner

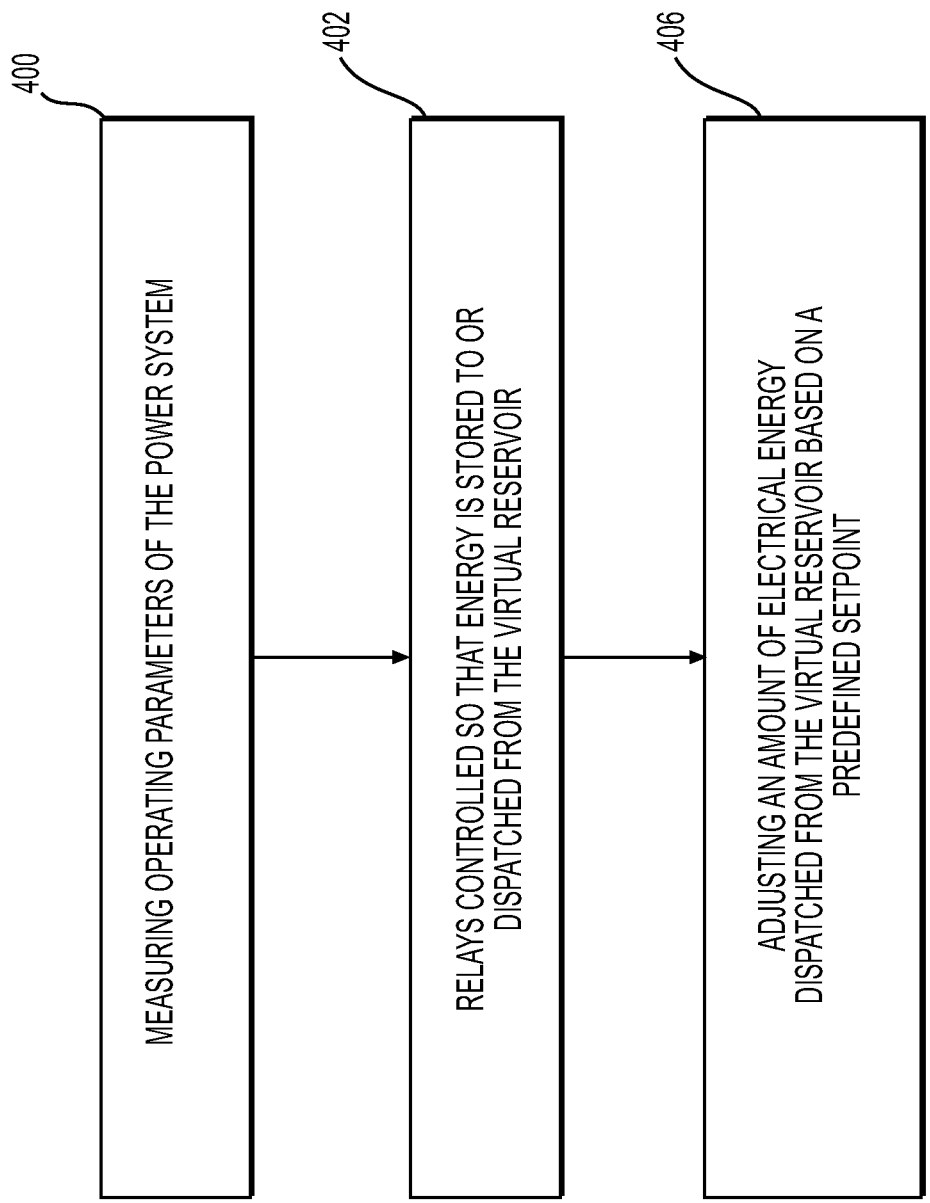

VIRTUAL RESERVOIR STORING ENERGY FOR A HYDROELECTRIC POWER PLANT

FIELD

The present disclosure relates to power generation in a hydroelectric utility, and particularly electrical generation and storage using renewable energy sources.

BACKGROUND INFORMATION

Historically, hydroelectric plants with reserve capacity of the worlds have been the largest source of energy of the electrical grid to prevent, and/or mitigate the risk of blackout in the face of high-impact natural phenomena. These plants have ensured a robust and flexible operation of the distribution network thus reducing their vulnerability in normal conditions and under contingencies.

Also, pumped hydroelectric energy storage PHES allows energy from intermittent sources such as solar and wind, or excess electricity from continuous base-load sources (such as coal or nuclear) to be saved for periods of higher demand. The reservoirs used with pumped storage are quite small when compared to hydroelectric dams of similar power capacity, and generating periods are often less than half a day.

At the present, more than ninety-six percent (96%) of the world's installed energy storage capacity comes from pumped storage. Able to provide renewable energy exactly when it is needed, these projects usually involve the construction of upper and lower water reservoirs, either with or without accompanying dams.

SUMMARY

A load management system for a hydroelectric power plant is disclosed, the system comprising: a power generator configured to generate electrical energy from a flow of water for supplying a power grid; a virtual reservoir configured to store the generated electrical energy and dispatch the stored electrical energy to the power grid; and a plurality of circuit breakers that connect an output of the power generator to the power grid and to the virtual reservoir; a control unit configured to control operating states of the plurality of circuit breakers so that the generated electrical energy is stored at the virtual reservoir and at least one of the generated electrical energy or the stored electrical energy is provided to the power grid.

A method for load balancing a hydroelectric power system is disclosed, the hydroelectric power system including a power generator, a plurality of sensors, a virtual reservoir, a plurality of interlocked circuit breakers, and a control unit, the method comprising: measuring, via the plurality of sensors, one or more operating parameters of the hydroelectric power system; and controlling, via the control unit, operating states of the plurality of interlocked circuit breakers to store electrical energy output by the power generator at the virtual reservoir and to dispatch electrical energy stored at the virtual reservoir to a power grid, wherein the operating states of the plurality of interlocked circuit breakers are controlled based on at least one of an operating setpoint or one or more measured operating parameters of the power system.

A non-transitory computer readable medium is disclosed, the computer readable medium being encoded with program code which, when placed in communicable contact with a computer processor, causes the computer processor to execute a method for load balancing a hydroelectric power system with demands of a power grid, the method comprising the steps of: receiving a plurality of measured power system parameters; and controlling operating states of a plurality of interlocked circuit breakers to store electrical energy output by a generator at a virtual reservoir and to dispatch electrical energy stored at the virtual reservoir to a power grid, wherein the operating states of the plurality of interlocked circuit breakers are controlled based on at least one of an operating setpoint of the power system or one or more of the measured power system parameters.

BRIEF DESCRIPTION OF THE DRAWINGS

Other objects and advantages of the present disclosure will be realized from the following description of exemplary preferred embodiments when read in conjunction with the drawings set forth herein.

FIG. 4 is a method illustrating a method for load handling management in accordance with an exemplary embodiment.

DETAILED DESCRIPTION

Exemplary embodiments of the present disclosure are directed to a manner of storing energy of a hydroelectric power plant for later use. The energy can be stored in an array of batteries, such as lithium-ion batteries. The storage of energy in the battery array enables energy to be stored without physical infrastructure necessary for pumping water.

A hydroelectric dam (HD) is a known structure which defines or is used in combination with a hydroelectric power station (e.g., power generator). The HD performs two important functions. First it includes a reservoir that stores water obtained from a natural resource (e.g., river, stream, lake, etc.). Second, the HD gradually releases the stored water or adjusts the flow of water from the reservoir according to power demands. The released water passes through a turbine/generator for providing energy to the power grid or load. Typically an HD can generate energy throughout the year if sufficient reserves are available by storing the water that flows through a river. In this arrangement, the river typically has sufficient flow over time to generate power at hours of high consumption. The HD requires a higher and relatively expensive investment, as well as a larger area for the construction of the reservoir and the plant.

A Run-of-River (RoR) hydroelectric plant uses part of the flow of a river to generate electricity. The RoR plant does not have a reservoir and therefore operates continuously because it does not have the capacity to store water (without reserves). The turbine is limited to its installed capacity because it converts the water available at the moment to electrical energy. The RoR can provide intermittent levels of electrical energy based on the flow of water passing through the turbine/generator.

A pumped hydroelectric energy storage (PHES) is a type of hydroelectric energy storage used by electric power systems for daily load balancing. The PHES system stores energy in the form of gravitational potential energy of water, pumped from a lower elevation reservoir for storage at a higher elevation. Low-cost surplus off-peak electric power is typically used to run the pumps. During periods of high electrical demand, the stored water is released through turbines to produce electric power. Although the losses of the pumping process make the plant a net consumer of energy overall, the system increases revenue by selling more electricity daily during periods of peak demand, when electricity prices are highest.

Independent system operator (ISO) is an organization formed at the recommendation of the Federal Energy Regulatory Commission (FERC). In the areas where an ISO is established, it coordinates, controls, and monitors the operation of the electrical power system, usually within a single US state, but sometimes encompassing multiple states.

Figure 1:
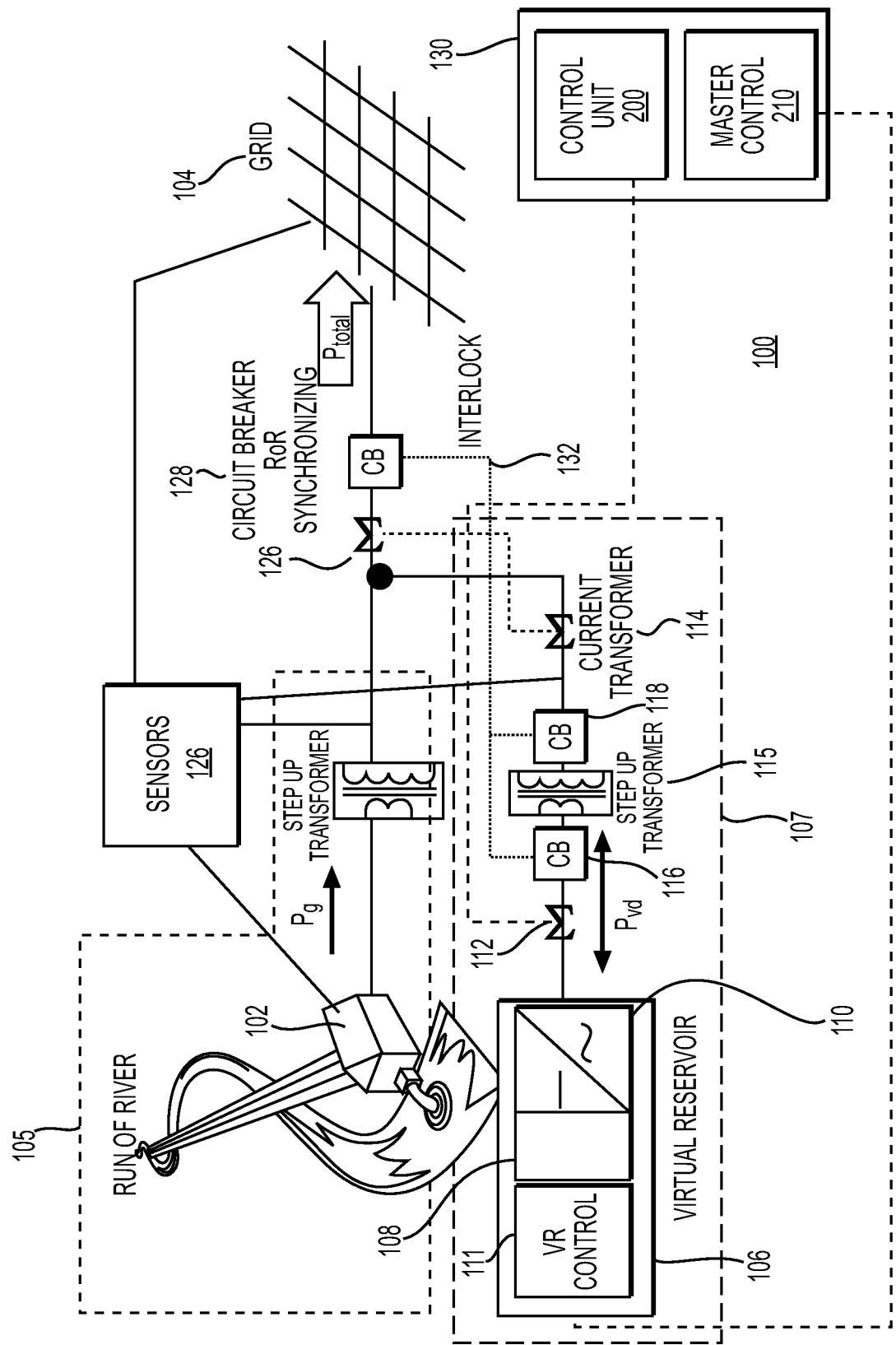
FIG. 1 illustrates a load management system for a hydroelectric power plant according to an exemplary embodiment of the present disclosure.

FIG. 1 illustrates a load management system for a hydroelectric power plant according to an exemplary embodiment of the present disclosure.

As shown in FIG. 1, the system 100 can include a power station 102 configured to generate electrical energy from the flow of river water for supplying a power grid 104. The power station 102 can be configured as a RoR, which does not have a physical reservoir for storing water for later use in generating electricity. The power station 102 can include any combination of power system components such as a water turbine which converts the kinetic an potential energy of water into mechanical work, one or more turbines/generators which converts the motive power of the water turbine into electrical energy, and any other suitable components as desired. The total amount of electrical energy generated by the power station is equal to $P_G$.

The system 100 can include a virtual reservoir 106 configured to store the generated electrical energy and dispatch the stored electrical energy to the power grid 104. The virtual reservoir 106 can include a reusable storage technology such as a battery storage system (BSS) 108 and a power inverter 110. The BSS 108 can include an array of batteries of any existing or future reusable battery technology including lithium ion, flow batteries, or any other suitable rechargeable battery as desired, which can store electrical energy for at least five (5) hours for later dispatch to the power grid 104. The power inverter 110 changes the alternating current to direct current for storage in the BSS 108 and performs the opposite operation when energy stored in the BSS 108 is dispatched to the power grid 104. The virtual reservoir 106 can also include a virtual reservoir (VR) controller 111 configured for controlling the charge and discharge operations BSS 108. As will be discussed detail below, the virtual reservoir 106 can be configured to supplement electrical energy supplied to the grid by the power station 102 during periods of high demand. The virtual reservoir 106 is included in a virtual reservoir circuit 107 that includes one or more current transformers 112, 114 configured to condition and/or transform the electrical energy flowing to/from the BSS 108 for storage/dispatch, one or more circuit breakers 116, 118 for connecting/disconnecting the reservoir circuit 107 for supplying power to the power grid 104, and step-up transformer 115.

The current transformers 112, 114 and circuit breakers 116, 118 are arranged in pairs on both sides of the step-up transformer 120. The transformer/breaker pairs are used for conditioning the electrical energy based on whether a storage or dispatch operation is being performed by the virtual reservoir 106. A first pair configured for controlling dispatch electrical energy from the virtual reservoir 106 to the power grid 104. The first pair includes the current transformer 112 and circuit breaker 116. The current transformer 112 is connected to an output of the power inverter 110 and circuit breaker 116 is connected between the current transformer 112 and the step-up transformer 120. A second pair configured for controlling the flow of electrical energy into the virtual reservoir 106 for storage includes the current transformer 114 and the circuit breaker 118. The current transformer 114 is connected to an output of the power station circuit 105 and the circuit breaker 118 is connected between the current transformer 114 and the step-up transformer 120. The total flow of energy to/from the virtual reservoir 106 is PVD.

The system 100 also includes a third transformer/breaker pair configured for controlling the flow of electrical energy from the power station 102 and/or the virtual reservoir 106 to the power grid 104. The current transformer 126 is connected to the both the output of the power station circuit 105 and the input/output of the virtual reservoir circuit 107. A circuit breaker 128 is a main synchronizing circuit breaker for the power station 100 and is connected between the current transformer 126 and the power grid 104.

The system 100 also includes a control system 130 configured to control operating states of the plurality of circuit breakers 116, 118, 128 so that the generated electrical energy is stored at the virtual reservoir 106 and at least one of the generated electrical energy or the stored electrical energy is provided to the power grid 104. The total active power injection to the power grid 104 ($P_{total}$) is equal to the sum of the active power injection from the RoR Power station 102 ($P_G$) plus the active power from the virtual reservoir 106 ($P_{VD}$) or:

$$P_{total}=P_G+P_{VD} \qquad (1)$$

Figure 2:
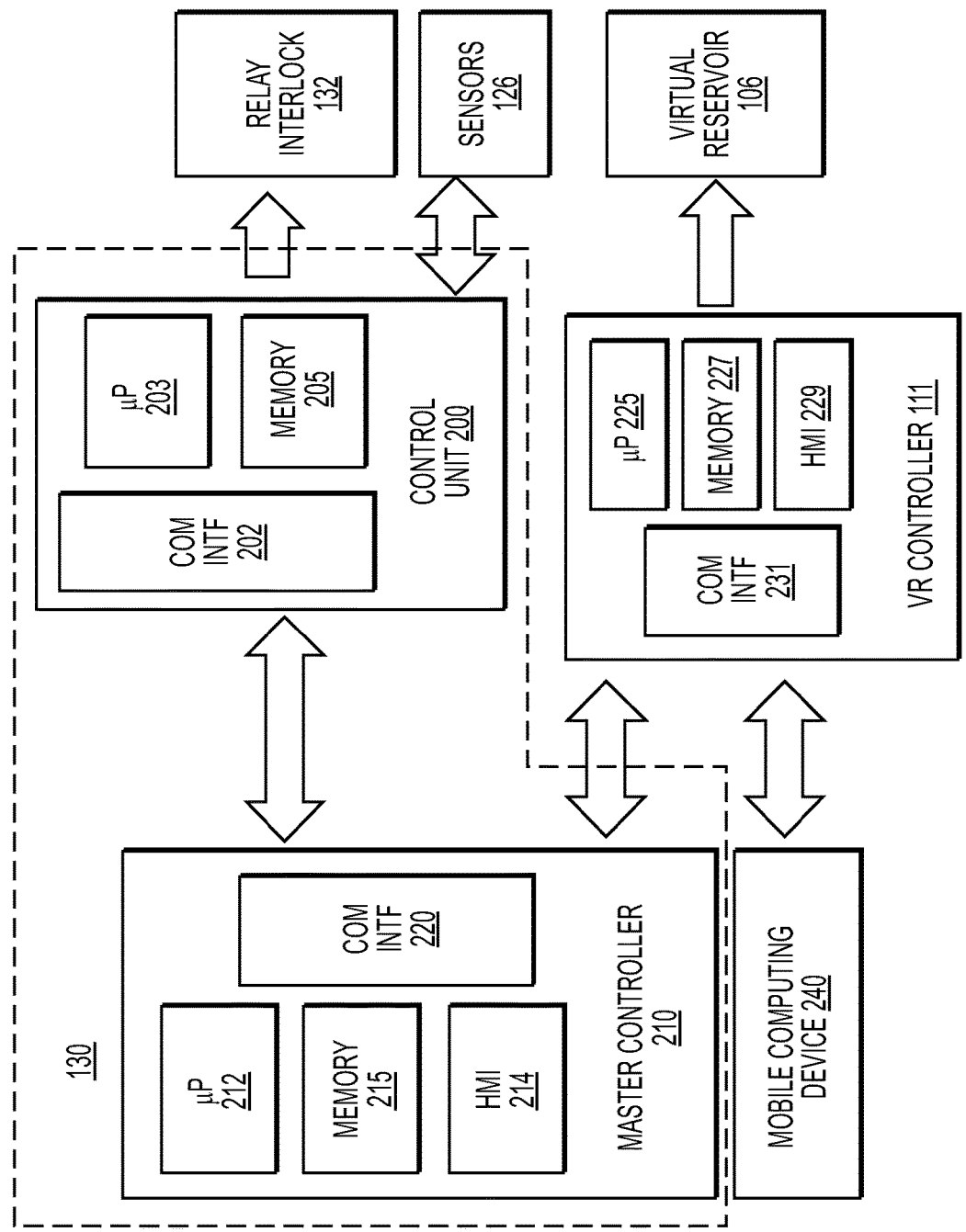
FIG. 2 illustrates a control system according to an exemplary embodiment of the present disclosure.

FIG. 2 illustrates a control system according to an exemplary embodiment of the present disclosure. As shown in FIG. 2, the control system 130 can include a control unit 200 and a master controller 210. The control unit 200 can include a combination of software and hardware components configured to operate as a real-time automation controller and/or a remote terminal unit. For example, the control unit 200 can include one or more processors 203 that are encoded with any number of software modules for performing specified control functions and/or computations. The control unit 200 can also include a communications infrastructure 202 capable of receiving and transmitting data over a wired or wireless network such as a local area network (LAN) or wide area network (WAN), and establishing a connection within the system components over a supervisory control and data acquisition (SCADA) network for communicating control data and commands. The control unit can be configured to include memory 205 for storing data and/or configuration information for communication and/or control.

The control system 130 can also include a master controller 210. The master controller 210 can be configured to include, but is not limited to, a desktop computer, a cluster of desktop computers, a server, a cluster of servers, a set-top box, or other similar type of device capable of obtaining input from an ISO or user, receiving data specifying operational status and measurement values of one or more components of system 100, and generating instructions and/or control signals for controlling the operation of one of more components of the system 100. The system 100 can include one or more sensors 126 for measuring a grid frequency in accordance with an exemplary embodiment.

As shown in FIG. 2, according to an exemplary embodiment of the present disclosure the master controller 210 can include one or more processors 212 encoded with one or more software modules for generating a Human Machine Interface (HMI) 214. The HMI 214 can be configured to generate a display providing measurement information and/or an operational status of various systems and components in the load management system 100 including one or more components and/or parameters of the power station circuit 103 and the virtual reservoir circuit 107. In addition, the HMI 214 can generate options for controlling operating modes of the load management system 100 including various components of the power station circuit 105 and the virtual reservoir circuit 107. For example, via the HMI 214, an ISO can send commands directly to the control unit 200 via the communication interface device 220. Those interface devices can receive commands from external control sources via DNP3 communication protocol. The master controller 210 can also include one or more memory devices 215 for storing data related to the virtual reservoir 106, the power station 102, and the power grid 104.

Turning back to FIG. 1, the system 100 can include a relay interlock 132 configured to interconnect the plurality of circuit breakers 116, 118, 128. The master controller 210 can be configured to generate control signals and/or data for controlling the control unit 200 to adjust the relay interlock 132 based on at least the electrical energy PG generated by the power station 102. The relay interlock 132 in an intelligent electronic device can include an IEC 61850 Process Bus Solution that allows the mapping of measurements made in the circuit breakers 116, 118, 128 to protection relays located in the control unit 200 and/or master controller 210 using secure communications. The IEC incorporates a HardFiber system designed to reduce the overall labor associated with the tasks of designing, documenting, installing and testing protection and control systems. By specifically targeting copper wiring and all of the labor it requires for the virtual reservoir 106, the HardFiber system allows for greater utilization and optimization of resources, eliminates a majority of copper wiring to better utilize resources for the design, building, commissioning and maintenance of power system protection and control; and employs a robust and simple architecture for deploying IEC 61850 process bus.

The exemplary relay interlock 132 as described above reduces exposure to cybersecurity threats through sealed communications and improves safety by limiting the number of high-energy signals in a control facility. Moreover, accordance with exemplary embodiments of the present disclosure the intelligent electronic device finds applications in multi-terminal line differential where 2 or more terminal are less than 2 Km away, and in remote protection and control rooms for MV switchgear to mitigate exposure of operators to arc flash hazards. Both of which can be properties of the virtual reservoir circuit 107. The intelligent electronic device is arranged to protect the generator windings of the power station 102, as the virtual reservoir is configured to dispatch the stored electrical energy to the power grid when the generator is in service.

According to an exemplary embodiment of the present disclosure, the HMI 214 of the master controller 210 can provide for directly setting real and reactive power dispatch setpoints of the virtual reservoir 106. The dispatch setpoints can be specified for each of a number of different operating modes and can only be effective when the generator is in operation and only when the main synchronizing circuit breaker 128 is closed. By virtue of the relay interlock 132 between the main synchronizing circuit breaker 128 and circuit breakers 116 and 118 in the virtual reservoir circuit 107, the master controller 210 ensures that virtual reservoir 106 cannot charge or discharge to the generator windings of the power station 102 in situations when the generator of the power station 102 is not operating and/or the main synchronizing circuit breaker 128 is open. The HMI 202 of the master controller 210 can include a control interlock associated with the control system of the virtual reservoir 106. The control interlock is a trigger that informs the control system of the virtual reservoir 106 when the generator output of the power station 102 is below PVD, which specifies a condition in which the BSS of the virtual reservoir 106 is not to be charged or discharged. For example, the following conditions should be satisfied for charging and discharging the BSS 108:

$$\text{Discharge Batteries } P_{total}=P_G+P_{VD}, P_G>P_{VD} \qquad (2)$$

$$\text{Charge Batteries } P_{total}=P_G-P_{VD}, P_{total}>0, \text{ and} \\ P_G>P_{VD} \qquad (3)$$

According to an exemplary embodiment of the present disclosure, the load management system 100 can provide over-generation protection for the virtual reservoir 106. FIG. 2 is a block diagram illustrating block diagram for communicating control signals and data with the master controller 210 according to an exemplary embodiment of the present disclosure. As shown in FIG. 2, the VR controller 111 can be configured to modify the electrical energy output of the virtual reservoir 106 so that the total output of the power station 102 and the virtual reservoir 106 does not pass a defined setpoint of generation to the power grid 104. The VR controller 111 can include one or more processors 225, memory 227 for storing data related to the virtual reservoir 106 and virtual reservoir circuit 107, and an HMI 229. The VR controller 111 also includes a communication interface 231 for sending and or receiving control signals and/or data to the virtual reservoir 106 and the master controller 210. The communication interface 231 can include a plurality of communication components for connected to and formatting data signals for communication over LAN, WAN, wireless, RF, SCADA, Bluetooth, or any other communication format as desired or specified for control. The electrical output setpoint of the virtual reservoir 106 can be defined through the HMI 212 of the master controller 210. The setpoint can be communicated to the control unit 200 for real-time control of the electrical output.

The virtual reservoir 106 can be controlled to operate in one of a number of operating modes. The control of the virtual reservoir 106 can be specified by the control system 130 in general, and more specifically the control unit 200 can communicate control signals from the master controller 210 to the VR controller 111.

In a Manual Mode (MM), the VR controller 111 and/or the master controller 210 can provide full control of the virtual reservoir 106 from an extendable and customizable native touch-screen interface (HMI) both locally and remotely. The Manual Mode can include a Manual Dispatch Mode. The remote HMI can be implemented via the HMI 202 of the master controller 210. According to another exemplary embodiment, the remote HMI can be implemented on a mobile computing device such as a smart phone, tablet, laptop, or other suitable electronic device having a capability for portability and dynamic connection to wireless network. For operations in a Manual Dispatch Mode, which involves the dispatch of electrical energy from the virtual reservoir 106, the virtual reservoir 106 including the virtual reservoir circuit 107 is synchronized with the power grid 104 and responds to operator settings without violating generator limits and protections of the power station 102. The Manual Dispatch mode provides manual control of a dispatch setpoint in which an operator can directly set real and reactive power dispatch setpoints via the HMI 229. As already discussed the HMI can be accessed via the VR controller 111, the master controller 210, and/or a mobile computing device 240.

According to an exemplary embodiment of the present disclosure, the load management system 100 can include an Automatic Generation Control Mode (AGC). The AGC Model is used for centralized/remote dispatch of multiple resources. In AGC Mode, the control unit 200 can be configured to control parameters and/or setpoints from the master controller 210. The control unit 200 can pass the received data and/or signal to the power grid 104 via a communications link. The AGC Dispatch Mode includes controllable parameters controllable Parameters Real Power Dispatch, Reactive Power Dispatch, and Ramp rate of Charge/Discharge.

In an Energy Trading Mode AGC signals will be sent to the facility to perform energy trading.

In a mode of Ramp mitigation on the power grid system, AGC signals will be sent by the control unit 200 to the power station 102 to perform ramp mitigation.

In a State of Charge (SOC) Management Mode (for SOC restoration), the BSS 108 of the virtual reservoir 106 can be moved to the BSS 108 of the virtual reservoir 106.

A Frequency Regulation service can be called a Tertiary Frequency Regulation (TFR). The TFR can be implemented by AGC control of the virtual reservoir 106 from the System Operator. The FFR, PFR, and SFR are frequency regulation contingency services that are implemented by the virtual reservoir 106 from grid frequency measurements at the RoR power station 102 and thus to do not require AGC.

The virtual reservoir 106 can also be controlled to operate in one of plural Frequency Control Modes. The various types of Frequency Control Modes available are based on selections selected through the HMI 202. According to the plural Frequency Control Modes:

The virtual reservoir 106 can operate according to a Fast Frequency Regulation (FFR), which is a contingency service (meaning has to be provided as priority over any other operations that virtual reservoir 106 is performing at the time) where the virtual reservoir 106 is configured to deliver 100% of the commitment reserve to the System Operator within the time of 1 second to 10 seconds according to a frequency droop function.

Primary Frequency Regulation (PFR) is one of the plural Frequency Control Modes which is a contingency service (meaning has to be provided as priority over any other operations that the virtual reservoir 106 is performing at the time) where the virtual reservoir 135 can be configured to deliver 100% of the commitment reserve to the ISO within the time of 10 seconds to 5 minutes according to a frequency droop function.

A Secondary Frequency Regulation (SFR) is a Frequency Control Mode representing a contingency service where the virtual reservoir is configured to deliver 100% of the commitment reserve to the ISO within the time of 5 minutes to 15 minutes according to a frequency droop function. According to an exemplary embodiment, during the SFR mode each of the one or more synchronous generators can be set to run at different speeds but at the same frequency, where multiple synchronous generators can be connected in parallel.

Tertiary Frequency Regulation (TFR) is a Frequency Control Mode in which the ISO sends an AGC signal to the virtual reservoir 106 to control the power grid system frequency.

Figure 3:
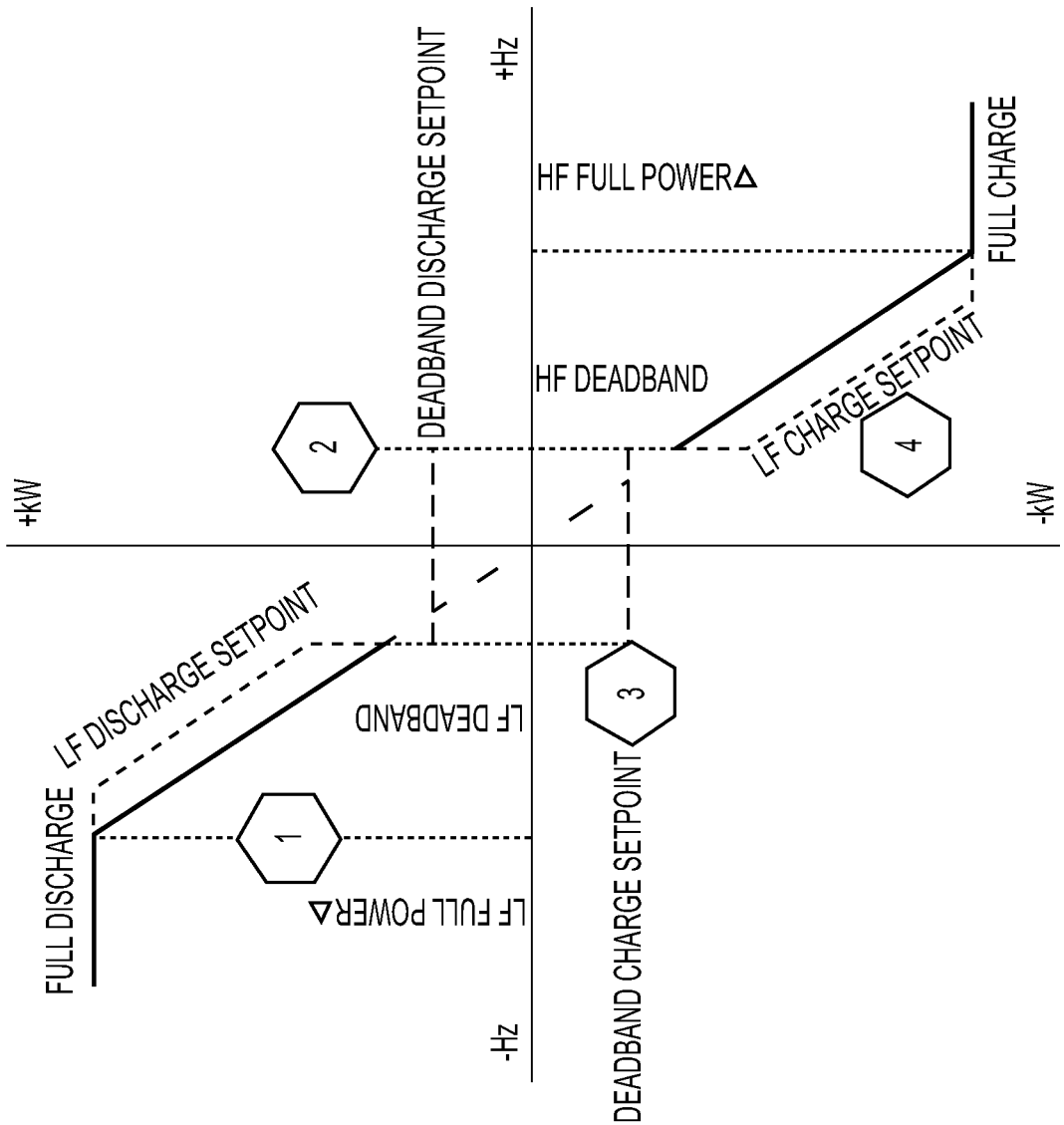
FIG. 3 is a diagram illustrating a graph for showing the maximum tolerance allowed from the High and Low Dead bands.

FIG. 3 is a diagram illustrating a graph for showing the maximum tolerance allowed from the High and Low Dead bands. The diagram of FIG. 3 is set in the context of an exemplary 60 Hz electrical system. The coordinates (60, 0) of the graph represent a setpoint in frequency (60) and power (0) such that the bounded box represents the range of deviation from that setpoint. According to an exemplary embodiment, the bounded box represents a deadband of ±1% in the Charge/Discharge Setpoint for the BSS 108. It should be understood that the setpoint coordinates can have values according to a mains or utility frequency as desired. For example, according to an exemplary embodiment the mains frequency can be 50 Hz with a setpoint of (50, 0). FIG. 3 illustrates a technique of droop speed control in which the power output of the one or more turbines/generators of the power station 102 is reduced as the line frequency increases. As such the rate of power produced by the power station 102 can be controlled based on the grid frequency.

Graph Line 1 of FIG. 3 represents the Full Power Delta Frequency, which is the deviation in Hertz, of the system frequency from the desired system frequency at which the BSS 108 should be at full power charge or discharge.

Graph line 2 of FIG. 3 shows the Dead Band Delta Frequency, which is a maximum deviation, in Hertz, between the measured system frequency and the desired system frequency, within which the HMI operating on the master controller 210 or VR controller 111, is free to either charge or discharge the BSS 108 in order to return it to a desired state of charge. Different Low Frequency and High Frequency delta values are permitted.

Graph line 3 of FIG. 3 shows a Dead band charge setpoint, Dead band discharge setpoint, which represent a maximum energy dispatch in Kilowatts, under a condition in which the battery will dispatch stored electrical energy while within the Frequency normal dead band setup. For example, the discharge setpoint will not allow the BSS 108 to discharge below 2% of maximum charge. That is, at a minimum the BSS 108 is configured to have at least a 2% charge at all times. Similarly, the charge setpoint will set a stop at 98% to 99% of maximum of full charge such the maximum charge capacity of the BSS 108 will be no more than 98% or 99%. As a result, SOC can be managed when frequency regulation is idle. A smaller setpoint will reduce deviation from the target grid frequency.

Graph line 4 of FIG. 3 is Low Frequency Discharge Setpoint, High Frequency Charge Setpoint, which are parameters representing a fixed value, in Kilowatts, for bias when the FFR is correcting for low frequency or high frequency. Bias allows the SOC to be managed when the system is following the frequency regulation droop curve.

Graph line 5 of FIG. 3 is a High SOC Dead band, Low SOC Dead band, which are parameters representing the maximum tolerance, in percentage points (e.g., ±1%), that a SOC of a the battery array of the BSS 108 may vary from the target value. Outside this range, dispatches will be biased to manage SOC.

According to an exemplary embodiment, when the line frequency falls below 60 Hz, the virtual reservoir 106 is discharged to inject energy into the system to drive the load. In contrast, when the frequency is above 60 Hz the system is experiencing more energy than is needed for the load. In this case, the virtual reservoir 106 is charged with the excess energy from the power line.

FIG. 4 is a method illustrating a method for load handling management in accordance with an exemplary embodiment.

The processing portions of the method can be implemented via HMI 202 of the one or more components of the load management system 100.

In a first step, one or more of a plurality of sensors measure operating parameters of the hydroelectric power system (400). The operating states of the plurality of interlocked circuit breakers 116, 118, 128 are controlled so that electrical energy output by the generator at the power station 102 is stored to the virtual reservoir 106 and to dispatch electrical energy stored at the virtual reservoir 106 to a power grid (402). The operating states of the plurality of interlocked circuit breakers are controlled based on at least one of an operating setpoint or one or more measured operating parameters of the power system 100. An amount of electrical energy is dispatched from the virtual reservoir based on a predefined setpoint of electrical energy to be supplied to the power grid (404).

System Hardware

With continued reference to the Figures included herein, the one or more processors of a control unit 200, master controller 210, or virtual reservoir controller 111 may be a special purpose or a general-purpose processor device. According to exemplary embodiments of the present disclosure the hardware processor or memory 205 connected to the hardware processor are encoded with a software suite suitable for carrying out the desired processing. The one or more processors may be connected to a communication infrastructure, such as an internal bus, message queue, network, multi-core message-passing scheme, etc.

The network 109 may be any network suitable for performing the functions as disclosed herein and may include a communications capability configuration for a local area network (LAN), a wide area network (WAN), a wireless network (e.g., Wi-Fi), a mobile communication network, a SCADA network, a satellite network, the Internet, fiber optic, coaxial cable, infrared, radio frequency (RF), or any combination thereof. Other suitable network types and configurations will be apparent to persons having skill in the relevant art.

The mobile computing device may include a memory 205 (e.g., random access memory, read-only memory, etc.), and may also include multiple memories. The memory may be read from and/or written to in a well-known manner. In accordance with an exemplary embodiment, the memory 205 can include non-transitory computer readable recording media (e.g., ROM, RAM hard disk drive, flash memory, optical memory, solid-state drive, etc.). A hardware processor device as discussed herein may be a single hardware processor, a plurality of hardware processors, or combinations thereof. Hardware processor devices may have one or more processor "cores."

Data stored in the master controller, control unit, and/or mobile computing device can include any type of suitable computer readable media, such as optical storage (e.g., a compact disc, digital versatile disc), magnetic storage (e.g., a hard disk drive), or solid-state drive. An operating system and one or more applications.

As already discussed, the one or more processors can include a communications infrastructure. According to an exemplary embodiment the control unit 200 may include a communications interface 214 as part of the communications infrastructure. The communications interface 214 for providing the communicating capability. The communications interface 204 may be configured to allow software and data to be transferred between the electronic edge device and other external devices as described herein. Exemplary communications interfaces 204 may include a wireless modem (e.g., transceiver), a network interface (e.g., an Ethernet card), a communications port, a PCMCIA slot and communications card or any other communication chip, etc. Software and data may be transferred via the communications interface to or from the external devices.

The memories can be non-transitory computer-readable recording media, and may store operating systems and/or computer programs to be executed by the mobile electronic device. Computer programs may also be received via the communications interface. Such computer programs, when executed, may enable the mobile electronic edge device to implement its operative functions. For instance, the operating system and/or computer programs, when executed, may enable the hardware processor device to access or operate hardware components such as a camera, or any desired sensor device GPS, peripheral interface, USB/Firewire/Thunderbolt interface ports, and/or display (e.g., LED screen, touch screen, etc.).

Numerous variations to embodiments disclosed herein will be readily apparent to those skilled in the art. In accordance with exemplary embodiments, the one or more smart edge devices can interface optionally to the cloud, and be configured with a specially developed operating system kernel although this is not necessary.

The software of the alleged invention can be configured in a newly developed operating system (OS), or provided as a software install package on a pre-existing operating system kernel. The functionality as described herein may thus be a kernel, or it may be an application that runs on another preexisting OS. The functionality as described can be a software and/or firmware load to be loaded on any of different pre-existing hardware platforms.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A load management system for a hydroelectric power plant, the system comprising:
    a power generator configured to generate electrical energy from a flow of water for supplying a power grid;
    a virtual reservoir configured to store the generated electrical energy and dispatch the stored electrical energy to the power grid;
    a step-up transformer connected between the virtual reservoir and the power grid;
    a plurality of circuit breakers that connect an output of the power generator to the power grid and to the virtual reservoir, wherein a first of the plurality of circuit breakers is connected between the virtual reservoir and the step-up transformer and a second of the plurality of circuit breakers is connected between the step-up transformer and the power grid;
    one or more sensors configured to measure grid frequency; and
    a control unit,
    wherein the control unit is configured to control operating states of the plurality of circuit breakers so that the generated electrical energy is stored at the virtual reservoir and so at least one of the generated electrical energy is provided to the power grid and the stored electrical energy is dispatched to the power grid, wherein the control unit is configured to control the operating states of the plurality of circuit breakers based on the measured grid frequency received from the one or more sensors, and wherein the control unit is configured to control, according to a frequency droop in the measured grid frequency, dispatch of a specified percentage of the stored electrical energy to the power grid within a specified time frame.

2. The system according to claim 1, wherein the plurality of circuit breakers further comprises:
a third circuit breaker connected to the output of the power generator and an output of the virtual reservoir, wherein the first circuit breaker and the second circuit breaker are both connected between the virtual reservoir and the third circuit breaker.

3. The system according to claim 2, comprising:
a relay interlock configured to interconnect the plurality of circuit breakers,
wherein the control unit is configured to control the relay interlock based on at least the generated electrical energy.

4. The system according to claim 1, wherein:
the virtual reservoir includes an array of batteries;
a first current transformer is connected between the second circuit breaker and the power grid; and
a second current transformer is connected between the first circuit breaker and the virtual reservoir.

5. The system according to claim 4, comprising:
a relay interlock configured to interconnect the plurality of circuit breakers,
wherein the control unit is configured to control the relay interlock based on the generated electrical energy.

6. The system according to claim 4, comprising:
a third current transformer connected to the output of the power generator,
wherein the control unit is configured to monitor and control the first, second, and third current transformers.

7. The system according to claim 4, wherein the virtual reservoir is configured to dispatch the stored electrical energy to the power grid when the generator is in service.

8. The system according to claim 1, wherein the control unit is configured to modify the dispatch of the stored electricity energy from the virtual reservoir based on a predefined setpoint of electrical energy to be supplied to the power grid.

9. The system according to claim 1, wherein the control unit comprises a graphical user interface.

10. The system according to claim 1, wherein the control unit is configured to control real power dispatch, reactive power dispatch, and ramp rate of charge and/or discharge at the virtual reservoir.

11. The system according to claim 1, wherein the control unit is configured to return the virtual reservoir to a specified state of charge.

12. A method of operating a hydroelectric power system connected to a power grid, the hydroelectric power system including a power generator, a plurality of sensors, a virtual reservoir, a plurality of interlocked circuit breakers, and a control unit, the method comprising:
measuring, via the plurality of sensors, one or more operating parameters of the hydroelectric power system, wherein the one or more operating parameters of the hydroelectric power system includes a grid frequency; and
controlling, via the control unit, operating states of the plurality of interlocked circuit breakers to store electrical energy output by the power generator at the virtual reservoir and to dispatch electrical energy stored at the virtual reservoir to the power grid,
wherein the operating states of the plurality of interlocked circuit breakers are controlled based on at least the measured grid frequency from the plurality of sensors,
wherein a step-up transformer is connected between the virtual reservoir and the power grid,
wherein a first of the plurality of interlocked circuit breakers is connected between the virtual reservoir and the step-up transformer and a second of the plurality of interlocked circuit breakers is connected between the step-up transformer and the power grid, and
wherein controlling, via the control unit, the operating states of the plurality of interlocked circuit breakers includes controlling, according to a frequency droop in the measured grid frequency, dispatch of a specified percentage of electrical energy stored at the virtual reservoir to the power grid within a specified time frame.

13. The method according to claim 12, wherein controlling the operating states of the plurality of interlocked circuit breakers is further based on the electrical energy output by the generator.

14. The method according to claim 12, further comprising:
adjusting an amount of electrical energy dispatched from the virtual reservoir based on a predefined setpoint of electrical energy to be supplied to the power grid.

15. The method according to claim 12, wherein controlling the operating states of the plurality of interlocked circuit breakers further includes:
controlling a dispatch of real power and reactive power from the virtual reservoir.

16. The method according to claim 12, wherein controlling the operating states of the plurality of interlocked circuit breakers further includes:
controlling a ramp rate of electrical energy charge and a ramp rate of electrical energy discharge at the virtual reservoir.

17. A non-transitory computer readable medium encoded with program code which, when placed in communicable contact with a computer processor, causes the computer processor to execute a method of operating a hydroelectric power system connected to a power grid, the hydroelectric power system including a power generator, a virtual reservoir, a plurality of interlocked circuit breakers, and a control unit, by executing the steps comprising:
receiving a plurality of measured power system parameters, wherein one of the plurality of measured power system parameters includes a grid frequency of the hydroelectric power system measured by one or more sensors configured to measure grid frequency; and
controlling operating states of the plurality of interlocked circuit breakers to store electrical energy output by the power generator at the virtual reservoir and to dispatch the electrical energy stored at the virtual reservoir to the power grid,
wherein the operating states of the plurality of interlocked circuit breakers are controlled based on at least the measured grid frequency of the hydroelectric power system,
wherein a step-up transformer is connected between the virtual reservoir and the power grid, wherein a first of the plurality of interlocked circuit breakers is connected between the virtual reservoir and the step-up transformer and a second of the plurality of interlocked circuit breakers is connected between the step-up transformer and the power grid, and
wherein controlling the operating states of the plurality of interlocked circuit breakers includes controlling, via the control unit and according to a frequency droop in the measured grid frequency, dispatch to the power grid of a specified percentage of the electrical energy stored at the virtual reservoir within a specified time frame.

* * * * *